(12) United States Patent
Mukoyama et al.

(10) Patent No.: US 6,914,111 B2
(45) Date of Patent: Jul. 5, 2005

(54) ION EXCHANGE POLYMER DISPERSION AND PROCESS FOR ITS PRODUCTION

(75) Inventors: Atsushi Mukoyama, Yokohama (JP); Toyoaki Ishisaki, deceased, late of Yokohama (JP); by Azusa Ishisaki, legal representative, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/157,917

(22) Filed: May 31, 2002

(65) Prior Publication Data

US 2003/0013774 A1 Jan. 16, 2003

(30) Foreign Application Priority Data

May 31, 2001 (JP) ........................................ 2001-164820
Jun. 7, 2001 (JP) ........................................ 2001-172782

(51) Int. Cl.[7] ............................................. C08F 230/04
(52) U.S. Cl. ........................... 526/240; 429/33; 429/42; 429/30; 427/115; 521/27; 526/242; 526/287
(58) Field of Search ............................ 429/30, 33, 42; 427/115; 521/27

(56) References Cited

FOREIGN PATENT DOCUMENTS

| EP | 0 094 679 | 11/1983 |
|---|---|---|
| EP | 1 139 472 | 10/2001 |
| EP | 1 139 472 A2 * | 10/2001 |
| JP | 5-75835 | 10/1993 |
| JP | 6-231779 | 8/1994 |
| WO | WO 97/40924 | 11/1997 |

OTHER PUBLICATIONS

U.S. Appl. No. 10/253,865, filed Sep. 25, 2002, Kinoshita et al.
U.S. Appl. No. 10/157,917, filed May 31, 2002, Mukoyama et al.
U.S. Appl. No. 09/820,850, filed Mar. 30, 2001, Higuchi et al.
U.S. Appl. No. 09/820,850, filed Mar. 30, 2001, pending.
U.S. Appl. No. 09/877,057, Jun. 11, 2001, pending.

* cited by examiner

*Primary Examiner*—Robert D. Harlan
(74) *Attorney, Agent, or Firm*—Oblon, Spivak, McClelland, Maier & Neustadt, P.C.

(57) ABSTRACT

An ion exchange polymer dispersion having an ion exchange polymer having sulfonic acid groups and a fibrilliform fluorocarbon polymer dispersed in a dispersion medium.

17 Claims, No Drawings

ION EXCHANGE POLYMER DISPERSION AND PROCESS FOR ITS PRODUCTION

The present invention relates to an ion exchange polymer dispersion.

The hydrogen-oxygen fuel cell receives attention as a power generating system having little adverse effect on the global environment because in principle, its reaction product is water only. Solid polymer electrolyte fuel cells were once mounted on spaceships in the Gemini project and the Biosatellite project, but their power densities at the time were low. Later, more efficient alkaline fuel cells were developed and have dominated the fuel cell applications in space including space shuttles in current use.

Meanwhile, with the recent technological progress, solid polymer electrolyte fuel cells are drawing attention again for the following two reasons: (1) the development of highly electroconductive membranes for use as solid polymer electrolytes and (2) the impartment of high activity to the catalysts for use in gas diffusion electrodes by the use of carbon as the support and an ion exchange resin coating.

For improved performance, the electric resistance of solid polymer membrane electrolytes can be reduced through increase in their sulfonic acid group density or reduction in membrane thickness. However, drastic increase in sulfonic acid group density causes problems such as deterioration of the mechanical and tensile strength of membrane electrolytes or dimensional change during handling or deterioration of their durability that makes them vulnerable to creeping during long operation. On the other hand, thinner membranes have lower mechanical and tensile strength, and therefore, are problematically difficult to process or handle when get attached to gas diffusion electrodes.

As a solution to the above-mentioned problems, a polytetrafluoroethylene (hereinafter referred to as PTFE) porous membrane impregnated with a fluorine-type ion exchange polymer having sulfonic acid groups was proposed (JP-B-5-75835). Although this solution can provide a thin membrane, there is still a problem that the inclusion of the porous PTFE prevents the electric resistance of the membrane from being lowered sufficiently. Besides, when it is used as an electrolyte membrane in a solid polymer electrolyte fuel cell, the hydrogen gas leaks increasingly during long operation of the cell due to the poor adhesion between the porous PTFE and the ion exchange polymer, and as a result, there is a problem of decline of the performance of the cell.

As a solution to the problem of the high electric resistance of the membrane, a cation exchange membrane reinforced with a perfluorocarbon polymer in the form of fibrils, woven fabric or nonwoven fabric was proposed (JP-A-6-231779). The membrane has low resistance and can provide a fuel cell with relatively good power generation characteristics, but since the membrane with a minimum thickness of 100 to 200 µm is not thin enough and not even in thickness, there are problems in power generation characteristics and applicability to mass production. Further, because the membrane shows high permeability to hydrogen gas due to the insufficient adhesion between the perfluorocarbon polymer and the fluorine-type ion exchange polymer having sulfonic acid groups, a fuel cell using it can not generate sufficient power.

The object of the present invention is to provide an ion exchange polymer dispersion which can give isotropic ion exchange membranes which have uniform and small thickness and low resistance and low permeability to hydrogen gas, dimensional stability against moisture and heat, high tear strength and good handling ability and can be put into mass production.

The present invention provides an ion exchange polymer dispersion having an ion exchange polymer having sulfonic acid groups and a fibrilliform fluorocarbon polymer dispersed in a dispersion medium and a process for its production.

An ion exchange membrane obtained from the ion exchange polymer dispersion of the present invention having sulfonic acid groups and a fibrilliform fluorocarbon polymer dispersed in a dispersion medium (hereinafter referred to as the dispersion of the present invention) contains a fibrilliform fluorocarbon polymer based reinforcement in the plane of the membrane uniformly (hereinafter referred to as the present reinforcement). An ordinary membrane containing the present reinforcement obtained by extrusion molding is anisotropic and shows different strengths in MD (the direction of the extrusion during the molding of the membrane) and in TD (the transverse direction which is perpendicular to MD). An ion exchange membrane obtained from the dispersion of the present invention) is less anisotropic, even possibly isotropic, and shows improved mechanical strength such as tearing strength, tensile strength and other mechanical strengths in all directions.

Therefore, a membrane-electrode assembly using such a membrane for use in solid polymer electrolyte fuel cells is easy to handle, and its dimensional change due to heat or moisture is very little and isotropic. Thus, a membrane-electrode assembly having a thin cation exchange membrane, which used to be difficult to produce, can be produced easily.

Since membranes obtained from the dispersion of the present invention has high mechanical strength in all directions irrespective of the MD or TD direction, membrane-electrode assemblies using such membranes have excellent durability. The gas supplied to the anode and cathode of a solid polymer electrolyte fuel cell is quite often humidified nearly to saturated vapor pressure to secure the proton permeability of the electrolyte. However, a simulation of the current density and the steam concentration in a membrane-electrode assembly revealed uneven distributions of current density, moisture and vapor pressure over the entire area which suggest a high possibility of uneven and local shrinkage or swelling of the assembly due to dehydration of part of the membrane or the resin in the catalyst layer which is exposed to locally generated heat. The present reinforcement uniformly distributed in the membrane prevents mechanical deformation and cracking resulting from the local shrinkage or swelling and imparts excellent durability to a membrane-electrode assembly having a thin membrane.

The dispersion of the present invention may also be used as a mixture with a powdery catalyst to form the electrode in a membrane-electrode assembly. Namely, an electrode containing the present reinforcement is obtainable from a mixture of the dispersion of the present invention and a powdery catalyst.

In the present invention, as the fibrilliform fluorocarbon polymer, a PTFE or a copolymer containing at least 95 mol % of polymerization units derived from tetrafluoroethylene may be mentioned. Such a copolymer has to be able to fibrillate and is preferably a copolymer of tetrafluoroethylene and a fluorine-containing monomer which preferably comprises at least 99 mol % of polymerization units derived from tetrafluoroethylene. Specifically, a PTFE, a tetrafluoroethylene-hexafluoropropylene copolymer, a tetrafluoroethylene-chlorotrifluoroethylene copolymer, a tetrafluoroethylene-perfluoro(2,2-dimethyl-1,3-dioxole) copolymer, or a tetrafluoroethylene-perfluoro(alkyl vinyl ether) such as a tetrafluoroethylene-perfluoro(butenyl vinyl ether) copolymer may be mentioned. Particularly preferred is a PTFE.

The dispersion of the present invention preferably contains the fibrilliform fluorocarbon polymer in an amount of from 0.5 to 15 mass % of the total solid content of the dispersion. If it is less than 0.5 mass %, the polymer does not show sufficient reinforcing effect, and if it exceeds 15 mass %, high resistance is likely to result. The fibrilliform fluorocarbon polymer is particularly preferably in an amount of from 2 to 10 mass % of the total solid content to exert sufficient reinforcing effect without increase in resistance and facilitate formation of an electrolyte membrane or a catalyst layer by preventing the dispersion of the present invention from becoming too viscous. Here, the amount of the fibrilliform fluorocarbon polymer means the total amount of the fluorocarbon polymer which can fibrillate irrespective of whether it is fibrillated or not, and includes the polymer both in the unfibrillated form and under fibrillation as well. For example, if the polymer is PTFE, it is the PTFE content based on the total mass of the solid matter in it.

The ion exchange polymer to be used in the present invention is preferably a fluorinated polymer having sulfonic acid groups, especially a perfluorocarbon polymer having sulfonic acid groups, in view of durability, especially when it makes up part of a membrane-electrode assembly for use in a fuel cell, though a wide variety of known polymers may be used.

As the perfluorocarbon polymer having sulfonic acid groups, a copolymer consisting of polymerization units derived from a perfluorovinyl compound specifically represented by the general formula $CF_2=CF(OCF_2CFX)_m-O_p-(CF_2)_nSO_3H$ (wherein X is a fluorine atom or a trifluoromethyl group, m is an integer of from 0 to 3, n is an integer of from 0 to 12, and p is 0 or 1, provided that when n is 0, p is also 0) and polymerization units derived from a perfluoroolefin or a perfluoroalkyl vinyl ether is preferable. As the perfluorovinyl compound, for example, the compound represented by any of the following formulae 1 to 4 may be mentioned. In the formulae 1 to 4, q is an integer of from 1 to 9, r is an integer of from 1 to 8, s is an integer of from 0 to 8, and z is 2 or 3.

$CF_2=CFO(CF_2)_qSO_3H$   formula 1

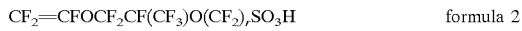

$CF_2=CFOCF_2CF(CF_3)O(CF_2)_rSO_3H$   formula 2

$CF_2=CF(CF_2)_sSO_3H$   formula 3

$CF_2=CF[OCF_2CF(CF_3)]_zOCF_2CF_2SO_3H$   formula 4

The polymer which comprises polymerization units derived from a perfluorovinyl compound having sulfonic acid groups is usually obtained by polymerization of a perfluorovinyl compound having a —SO$_2$F group. The perfluorovinyl compound having a —SO$_2$F group is usually copolymerized with a comonomer such as a perfluoroolefin or a perfluoro(alkyl vinyl ether) due to small reactivity of radical polymerization, though it may be polymerized alone. As a perfluoroolefin used for a comonomer may, for example, tetrafluoroethylene, hexafluoropropylene or the like may be mentioned. Usually, the use of tetrafluoroethylene is preferred.

The perfluoro(alkyl vinyl ether) as a comonomer is preferably a compound represented by $CF_2=CF-(OCF_2CFY)_t-O-R^f$ wherein Y is a fluorine atom or a trifluoromethyl group, t is an integer of from 0 to 3, and $R^f$ is a linear or branched perfluoroalkyl group represented by $C_uF_{2u+1}$ ($1 \leq u \leq 12$). Preferable examples of the compound represented by $CF_2=CF-(OCF_2CFY)_t-O-R^f$ include compounds represented by the formulae 5 to 7. In the formulae 5 to 7, v is an integer of from 1 to 8, w is an integer of from 1 to 8, and x is an integer of from 1 to 3.

$CF_2=CFO(CF_2)_vCF_3$   formula 5

$CF_2=CFOCF_2CF(CF_3)O(CF_2)_wCF_3$   formula 6

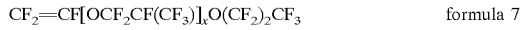

$CF_2=CF[OCF_2CF(CF_3)]_xO(CF_2)_2CF_3$   formula 7

In addition to a perfluoroolefine or a perfluoro(alkyl vinyl ether), other fluorine-containing monomers such as perfluoro(3-oxahepta-1,6-diene) may be copolymerized with the perfluorovinyl compound having —SO$_2$F as a copolymer.

A fluorine-free polymer or a partially fluorinated polymer having sulfonic acid groups is preferable to a perfluorocarbon polymer having sulfonic acid groups in terms of heat resistance. As such an ion exchange polymer, a copolymer comprising polymerization units represented by the formula 8 and polymerization units represented by the formula 9 may, for example, be mentioned, wherein $P^1$ is a phenyltriyl group, a biphenyltriyl group, a naphthalenetriyl group, a phenanthrenetriyl group or an anthracenetriyl group, P2 is a phenylene group, a biphenylene group, a naphthylene group, a phenanthrylene group or an anthracylene group, $A^2$ is a SO$_3$M group (wherein M is a hydrogen atom or an alkali metal atom) or a group hydrolyzable thereto, $B^1$ and $B^2$ are independently oxygen atoms, sulfur atoms, sulfonyl groups or isopropylidene groups, provided that the constitutional isomerism of $P^1$ and $P^2$ are not particularly restricted, and at least one hydrogen atom in each of $P^1$ and $P^2$ may be substituted by a fluorine atom, a chlorine atom, a bromine atom or an alkyl group having from 1 to 3 carbon atoms.

Formula 8

$$—P^1—B^1—$$
$$\ \ \ \ |$$
$$\ \ \ \ A^1$$

Formula 9

$$—P^2—B^2—$$

In the present invention, the sulfonic acid group concentration, i.e. the ion exchange capacity, of the ion exchange polymer is preferably from 0.5 to 2.0 meq/g dry resin, especially from 0.7 to 1.6 meq/g dry resin. If an ion exchange polymer with an ion exchange capacity below this range is used in preparation of an electrolyte membrane or an electrode for solid polymer electrolyte fuel cells, the resistance of the electrolyte membrane or electrode tends to be large, while if the ion exchange capacity is above this range, the mechanical strength of the electrolyte membrane or electrode tends to be insufficient.

The dispersion medium in the dispersion of the present invention is not particularly limited and is exemplified below.

Monohydric alcohols such as methyl alcohol, ethyl alcohol, n-propyl alcohol, n-butyl alcohol and isopropyl alcohol and polyhydric alcohols such as ethylene glycol, propylene glycol and glycerine.

Fluorine-containing alcohols such as 2,2,2-trifluoroethanol, 2,2,3,3,3-pentafluoro-1-propanol, 2,2,3,3-tetrafluoro-1-propanol, 2,2,3,4,4,4-hexafluoro-1-butanol, 2,2,3,3,4,4,4-heptafluoro-1-butanol and 1,1,1,3,3,3-hexafluoro-2-propanol.

Oxygen- or nitrogen-containing perfluoro compounds such as perfluorotributylamine and perfluoro-2-n-butyltetrahydrofuran, chlorofluorocarbons such as 1,1,2-trichloro-1,2,2-trifluoroethane, hydrochlorofluorocarbons such as 3,3-dichloro-1,1,1,2,2-pentafluoropropane, 1,3-dichloro-1,1,2,2,3-pentafluoropropane, and polar solvents such as N,N-dimethylformamide, N,N-dimethylacetamide, dimethyl sulfoxide and water may be used.

These dispersion media may be used singly or in combination of at least two. The concentration of the dispersion of the present invention is preferably such that the amount of the ion exchange polymer is from 0.3 to 30 mass % of the total mass of the dispersion. If it is less than 0.3 mass %, evaporation of the dispersion medium takes long time or reduction of the evaporation time requires heating at high temperature which leads to cause irreversible size reduction of the ion clusters in the ion exchange resin or lower proton permeability. If the concentration is higher than 30 mass %, the dispersion of the present invention is too viscous and shows poor coating properties in formation of an electrolyte membrane or a catalyst layer. The particularly preferable concentration is from 5 to 25 mass %.

Now, preparation of the dispersion of the present invention will be described. The dispersion of the present invention is obtainable by the process (1) or (2).

(1) A process comprising a mixing step of mixing a fluorine-containing polymer having precursor of sulfonic acid groups and a fluorocarbon polymer which can fibrillate, at a temperature between 150° C. and the melting point of the fluorocarbon polymer which can fibrillate, a fibrillation step of fibrillating the fluorocarbon polymer which can fibrillate, an acid conversion step of converting the precursor of the sulfonic acid group into a sulfonic acid to obtain a fluorine-containing polymer having sulfonic acid groups, and a dispersion step of dispersing the fibrillated fluorocarbon polymer which can fibrillate and the fluorine-containing polymer having sulfonic acid groups, in a dispersion medium.

(2) A process comprising a step of mixing a solution or dispersion of a polymer having sulfonic acid groups and a dispersion of a fluorocarbon polymer which can fibrillate, and a step of applying a shearing force to the mixed solution obtained in the preceding step to fibrillate the fluorocarbon polymer which can fibrillate.

In the process (1), the precursor of a sulfonic acid group means a group which can be converted into a sulfonic acid by hydrolysis or acid treatment and concretely means a $-SO_2F$ group, $-SO_2Cl$ group or the like. The process (1) is explained concretely below. The mixing step and the fibrillation step may be combined together. Firstly, powder of a fluorinated polymer having $-SO_2F$ groups and powder of a fluorocarbon polymer which can fibrillate are compounded at a temperature between 150° C. and the melting point of the fluorocarbon polymer which can fibrillate in a twin screw extruder. The compounding makes the powders of the fluorinated polymer having $-SO_2F$ groups and the fluorocarbon polymer which can fibrillate mix homogeneously concurrently with fibrillation of the fluorocarbon polymer which can fibrillate, and then is followed by pelletization. If the compounding temperature is lower than 150° C., homogenous mixing of the powders of the fluorinated polymer having $-SO_2F$ groups and the fluorocarbon polymer which can fibrillate and fibrillation of the fluorocarbon polymer which can fibrillate are hardly attained.

For further fibrillation of the fluorocarbon polymer, the pellets may be molded into film by extrusion in an extra fibrillation step. During the compounding (and film formation by extrusion) by a twin screw extruder, the fluorocarbon polymer fibrillates by the shearing force applied to them.

In the subsequent acid conversion step, the resulting pellets or film is subjected to hydrolysis or acid treatment which converts the $-SO_2F$ groups into sulfonic acid groups ($-SO_3H$ groups). In the following dispersion step, the pellets or film obtained in the acid conversion step is dispersed in a dispersion medium to give the dispersion of the present invention. It is preferable to pulverize the pellets or film to a powder having particle sizes of the order of from 100 μm to 1 mm by means of a pulverizer such as a freeze pulverizer before the pellets or film is dispersed in the dispersion medium because it facilitates the dispersion.

In the dispersion step, it is desirable that the temperature of the dispersion medium is such a temperature that the fluorinated polymer dissolves or uniformly disperses in the dispersion medium. If the desirable temperature is higher than the boiling point of the dispersion medium at ordinary pressure, the dispersion step may be carried out under pressure. In the dispersion step, the temperature of the dispersion medium is maintained usually within the range of room temperature to 270° C., preferably within the range of from 60 to 250° C. If the temperature is too low, it takes extra effort or a long time to disperse the fluorinated polymer having sulfonic acid groups and the fibrilliform fluorocarbon polymer uniformly. On the other hand, if the temperature is too high, the sulfonic acid group concentration can decrease. The dispersion duration is usually about from 1 minute to 1 day. The dispersion may be accelerated by stirring or sonication.

Then, the process (2) is explained concretely below. In the first step of the process (2), a solution obtained by dissolving or dispersing a polymer having sulfonic acid groups in a solvent (a dispersion medium) is mixed with a dispersion of a fluorocarbon polymer which can fibrillate in a dispersion medium. The process is applicable to both fluorine-containing and fluorine-free ion exchange polymers. As the solvent and the dispersion medium used herein, any dispersion mediums previously mentioned as examples of the dispersion medium in the dispersion of the present invention may be used without any special restriction. Then, a shearing force is applied to the resulting mixed solution to fibrillate the fluorocarbon polymer which can fibrillate. Specifically speaking, the application of the shearing force to the fluorocarbon polymer which can fibrillate is performed by stirring or grinding. Any stirrer or grinder that can apply a shearing force to the fluorocarbon polymer which can fibrillate may be used without any particular restriction. After the fluorocarbon polymer which can fibrillate is fibrillated in the dispersion by stirring or grinding, the dispersion of the present invention is obtained.

Since a fluorocarbon polymer which can fibrillate usually has a transition temperature about room temperature, it is supposed to easily fibrillate at room temperature and above. However, a fluorocarbon polymer having a particular molecular weight or comprising a particular copolymer component in a particular proportion can have too low a viscosity at high temperature to generate sufficient shearing force and can not undergo fibrillation. In such a case, it is preferred to carry out stirring or grinding at room temperature. In general, a fluorocarbon polymer having a high molecular weight and small particle sizes is preferred since the ease of fibrillation of a fluorocarbon polymer which can fibrillate increases as its molecular weight increases and as its particle size decreases.

The presence of the fibrilliform fluorocarbon polymer in the dispersion of the present invention can be confirmed with a scanning electron microscope (an SEM), specifically by the following method.

The dispersion of the present invention is so dropped in a petri dish as to have a uniform thickness of about 30 μm upon drying and maintained in an oven at 60° C. for 3 hours to form a cast film. When the cast film is peeled off the petri dish and observed under an SEM at a magnification of from 5,000 to 10,000 after plasma etching on the surface, short fibers of the fibrillated fluorocarbon polymer can be seen.

It is preferred that the proportion of fibrils having diameters of 1 μm or less to the observed fibrils is at least 70%, particularly at least 95%. If the proportion is less than 70%, the fibrils may not have sufficient reinforcing effect on a membrane obtained from the dispersion of the present invention.

EXAMPLES

Example 1

9,730 g of a powdery copolymer consisting of polymerization units derived from tetrafluoroethylene and polymerization units derived from $CF_2=CF-OCF_2CF(CF_3)O(CF_2)_2SO_2F$ (with an ion exchange capacity of 1.1 meq/g dry resin; hereinafter referred to as copolymer A) and 270 g of a powdery PTFE (product name: Fluon CD-1, manufactured by Asahi Glass Company, Limited) were mixed and extruded with a twin screw extruder to give 9,500 g of pellets. The pellets were hydrolyzed in an aqueous solution containing 30%, based on the total mass of the solution, of dimethyl sulfoxide and 15%, based on the total mass of the solution, of potassium hydroxide, immersed in 1 mol/L hydrochloric acid for 16 hours for conversion into the acid form (sulfonic acid groups), washed with water and dried.

The pellets were dispersed in ethanol to give an ion exchange polymer dispersion containing the fibrilliform fluorocarbon polymer which had a solid content of 10%, based on the total mass of the dispersion) and contained (2.7%, on a solid basis) of the fibrilliform fluorocarbon polymer and the perfluorocarbon polymer having sulfonic acid groups.

The ion exchange polymer dispersion was casted on a polyethylene terephthalate (PET) film with a silicone releasant-treated surface with a die coater to form a 30 μm-thick ion exchange membrane containing 2.7 mass % of the fibrilliform fluorocarbon polymer as a reinforcement.

For measurement of tear strength, the membrane was immersed in pure water at 90° C. for 16 hours, and strip specimens of 5 cm in width and 15 cm in length were cut from the ion exchange membrane. A longitudinal cut was made in each sample over 7.5 cm, i.e., half the length 15 cm, from the center of a short edge to provide it with two legs of equal width. The end of one leg was fixed to the upper chuck of a tester, and the end of the other to the lower chuck to tear the specimen from the crotch. The tearing load was measured while the distance between the chucks was increased at a rate of 200 mm/min at 25° C. The tearing strength was calculated by dividing the tearing load by the thickness of the sample and averaged among five samples.

The tear strength of the fibril-containing ion exchange membrane thus measured was 2 N/mm.

A 5 mm-wide strip specimen was cut from the fibril-containing ion exchange membrane and maintained in a thermo-hygrostat at a temperature of 80° C. and a relative humidity of 95% with five platinum wires placed on it crosswise in parallel at 5 mm intervals, and the AC impedance between platinum wires was measured under an alternating current with a frequency of 10 KHz to obtain the specific AC resistance. As the five platinum wires placed at 5 mm intervals afforded variety to the cathode-anode distance, the AC resistance was measured at cathode-anode distances of 5, 10, 15 and 20 mm. The specific resistance of the membrane was calculated from the slope of the plot of the cathode-anode distance vs. the resistance so as to exclude the influence of the contact resistance between the platinum wires and the membrane. The cathode-anode distance and the measured resistance showed a linear relation, and the specific resistance was calculated from the slope of the plot of them and the thickness in accordance with the following formula.

Specific resistance ρ (Ω·cm)=the sample width (cm)×the sample thickness (cm)×the cathode-anode distance (Ω/cm).

The calculated specific resistance of the fibril-containing ion exchange membrane was 4 (Ω·cm).

Example 2

Pellets were prepared in the same manner as in Example 1 except that the amount of the copolymer A powder was changed to 9,600 g, and the amount of the PTFE powder was changed to 400 g, and an ion exchange polymer dispersion containing a fibrilliform fluorocarbon polymer was prepared in the same manner as in Example 1 from the pellets.

An ion exchange membrane was formed using the ion exchange polymer dispersion in the same manner as in Example 1, and the fibril-containing ion exchange membrane was evaluated in the same manner as in Example. The number of fibrils with diameters smaller than 1 μm was 96% of the total number of fibrils. The specific resistance and the tearing strengths of the ion exchange membrane were measured and found to be 4 Ω·cm and 4 N/mm, respectively.

Example 3

An ion exchange polymer dispersion comprising a fibrilliform fluorocarbon polymer and a perfluorocarbon polymer having sulfonic acid groups which a solid content of 10% based on the total mass of the dispersion was prepared in the same manner as in Example 1 except that a mixed dispersion medium containing ethanol and deionized water in a mass ratio of 80/20 was used as the dispersion medium instead of ethanol.

The ion exchange polymer dispersion was formed into an ion exchange membrane of 30 μm in thickness containing 2.7 mass % of a fibrilliform fluorocarbon polymer as a reinforcement. The fibril-containing ion exchange membrane was evaluated in the same manner as in Example 1, and the number of fibrils with diameters smaller than 1 μm was 90% of the total number of fibrils. The specific resistance and the tearing strengths of the ion exchange membrane were measured and found to be 4 Ω·cm and 2 N/mm, respectively.

Example 4

Copolymer A was hydrolyzed, converted to the acid form and dispersed in ethanol at a concentration of 9 mass %, and the resulting dispersion was concentrated to a solid content of 11.6 mass %. 11 g of the resulting dispersion and 0.25 g of a PTFE dispersion (product name: Aflon AD1, Asahi Glass Company, Limited) were mixed and dispersed in a homogenizer (product name: Polytron homogenizer Model K, Kinematica) at a rotational speed of 25,000 RPM for 10 minutes to apply a shearing force to promote fibrillation by applying a shearing force to the PTFE dispersion. Thus, an ion exchange polymer dispersion containing a fibrilliform fluorocarbon polymer which comprises a fibrilliform fluorocarbon polymer and a perfluorocarbon polymer having sulfonic acid groups was obtained.

The ion exchange polymer dispersion was formed into an ion exchange membrane in the same manner as in Example 1. The specific resistance and the tear strength of the fibril-containing ion exchange membrane were measured and found to be 4 Ω·cm and 3 N/mm, respectively.

Example 5

Comparative Example

An ion exchange polymer dispersion having a solid content of 10%, based on the total mass of the dispersion, was prepared in the same manner as in Example 1 except that pellets consisting of copolymer A only was used instead of pellets consisting of copolymer A and PTFE.

The ion exchange polymer dispersion as a coating solution was casted by means of a die coater to form an ion exchange membrane of 30 μm in thickness. The specific resistance and the tear strengths of the ion exchange membrane were measured and found to be 4 Ω·cm and 0.5 N/mm, respectively.

Example 6

Comparative Example 9,730 g of a powdery copolymer consisting of polymerization units derived from tetrafluoroethylene and polymerization units derived from $CF_2=CF-OCF_2CF(CF_3)O(CF_2)_2SO_2F$ (with an ion exchange capacity of 1.1 meq/g dry resin) and 270 g of a powdery PTFE (product name: Fluon CD-1, manufactured by Asahi Glass Company, Limited) were mixed and extruded with a twin screw extruder to give 9,500 g of pellets. The pellets were formed into film through a single screw extruder. However, no film thinner than 150 μm was obtained, and no attempt to reduce the thickness beyond that succeeded without making a hole.

The ion exchange polymer dispersion of the present invention can provide an ion exchange membrane with a uniformly thin thickness and high tear strength. A solid polymer fuel cell using an ion exchange membrane obtained from the ion exchange polymer dispersion of the present invention as an electrolyte membrane is excellent in output characteristics and durability.

The entire disclosures of Japanese Patent Application No. 2001-164820 filed on May 31, 2001 and Japanese Patent Application No. 2001-172782 filed on Jun. 7, 2001 including specifications, claims and summaries are incorporated herein by reference in their entireties.

What is claimed is:

1. An ion exchange polymer dispersion having an ion exchange polymer having sulfonic acid groups and a fibrilliform fluorocarbon polymer dispersed in a dispersion medium, which contains the fibrilliform fluorocarbon polymer in an amount of from 0.5 to 15 mass % of the total solid mass of the dispersion.

2. The ion exchange polymer dispersion according to claim 1, wherein the fibrilliform fluorocarbon polymer is a polytetrafluoroethylene or a copolymer comprising at least 95 mol % of polymerization units derived from tetrafluoroethylene.

3. The ion exchange polymer dispersion according to claim 1, wherein the fibrilliform fluorocarbon polymer is a polytetrafluoroethylene or a copolymer comprising at least 95 mol % of polymerization units derived from tetrafluoroethylene.

4. The ion exchange polymer dispersion according to claim 1, wherein the ion exchange polymer is a fluorinated polymer having sulfonic acid groups.

5. The ion exchange polymer dispersion according to claim 4, wherein the fluorinated polymer having sulfonic acid groups consists of polymerization units derived from tetrafluoroethylene and polymerization units derived from $CF_2=CF(OCF_2CFX)_m-O_p-(CF_2)_nSO_3H$ (wherein X is a fluorine atom or a trifluoromethyl group, m is an integer of from 0 to 3, n is an integer of from 0 to 12, and p is 0 or 1, provided that when n is 0, p is also 0).

6. The ion exchange polymer dispersion according to claim 4, wherein the fibrilliform fluorocarbon polymer is a polytetrafluoroethylene or a copolymer comprising at least 95 mol % of polymerization units derived from tetrafluoroethylene.

7. A process for producing an ion exchange polymer dispersion having an ion exchange polymer which is a fluorinated polymer having sulfonic acid groups and a fibrilliform fluorocarbon polymer dispersed in a dispersion medium, which comprises:

a mixing step of mixing a fluorinated polymer having precursors of sulfonic acid groups and a fluorocarbon polymer which can fibrillate, at a temperature between 150° C. and the melting point of the fluorocarbon polymer which can fibrillate, a fibrillation step of fibrillating the fluorocarbon polymer which can fibrillate, an acid conversion step of converting the precursor of the sulfonic acid group into a sulfonic acid group to obtain a fluorinated polymer having sulfonic acid groups, and a dispersion step of dispersing the fibrillated fluorocarbon polymer which can fibrillate and the fluorinated polymer having sulfonic acid groups, in a dispersion medium.

8. The process for producing an ion exchange polymer dispersion according to claim 7, wherein the fluorinated having sulfonic acid groups consists of polymerization units derived from tetrafluoroethylene and polymerization units derived from $CF_2=CF(OCF_2CFX)_m-O_p-(CF_2)_nSO_3H$ (wherein X is a fluorine atom or a trifluoromethyl group, m is an integer of from 0 to 3, n is an integer of from 0 to 12, and p is 0 or 1, provided that when n is 0, p is also 0).

9. The process for producing an ion exchange polymer dispersion according to claim 7, wherein the temperature of the dispersion medium is maintained in the temperature range from room temperature to 270° C. in the dispersion step.

10. The process for producing an ion exchange polymer dispersion according to claim 7, wherein the fibrilliform fluorocarbon polymer is a polytetrafluoroethylene or a copolymer comprising at least 95 mol % of polymerization units derived from tetrafluoroethylene.

11. The process for producing an ion exchange polymer dispersion according to claim 8, wherein the temperature of the dispersion medium is maintained in the temperature range from room temperature to 270° C. in the dispersion step.

12. The process for producing an ion exchange polymer dispersion according to claim 8, wherein the fibrilliform fluorocarbon polymer is a polytetrafluoroethylene or a copolymer comprising at least 95 mol % of polymerization units derived from tetrafluoroethylene.

13. A process for producing an ion exchange polymer dispersion having an ion exchange polymer having sulfonic acid groups and a fibrilloform fluorocarbon polymer dispersed in a dispersion medium, which comprises:

a step of mixing a solution or dispersion of a polymer having sulfonic acid groups and a dispersion of a fluorocarbon polymer which can fibrillate, and a step of applying a shearing force to the mixed solution or dispersion obtained in the preceding step to fibrillate the fluorocarbon polymer which can fibrillate.

14. The process for producing an ion exchange polymer dispersion according to claim 13, wherein the ion exchange polymer is a fluorinated polymer having sulfonic acid groups.

15. The process for producing an ion exchange polymer dispersion according to claim 14, wherein the fluorinated polymer having sulfonic acid groups consists of polymerization units derived from tetrafluoroethylene and polymerization units derived from $CF_2=CF(OCF_2CFX)_m-O_p-(CF_2)_n SO_3H$ (wherein X is a fluorine atom or a trifluoromethyl group, m is an integer of from 0 to 3, n is an integer of from 0 to 12, and p is 0 or 1, provided that when n is 0, p is also 0).

16. The process for producing an ion exchange polymer dispersion according to claim 13, wherein the fibrilliform fluorocarbon polymer is a polytetrafluoroethylene or a copolymer comprising at least 95 mol % of polymerization units derived from tetrafluoroethylene.

17. The process for producing an ion exchange polymer dispersion according to claim 14, wherein the fibrilliform fluorocarbon polymer is a polytetrafluoroethylene or a copolymer comprising at least 95 mol % of polymerization units derived from tetrafluoroethylene.

* * * * *